C. B. WALKER.
AUTOMATIC ELECTRIC GENERATING PLANT.
APPLICATION FILED MAR. 14, 1910.
1,217,670.
Patented Feb. 27, 1917.
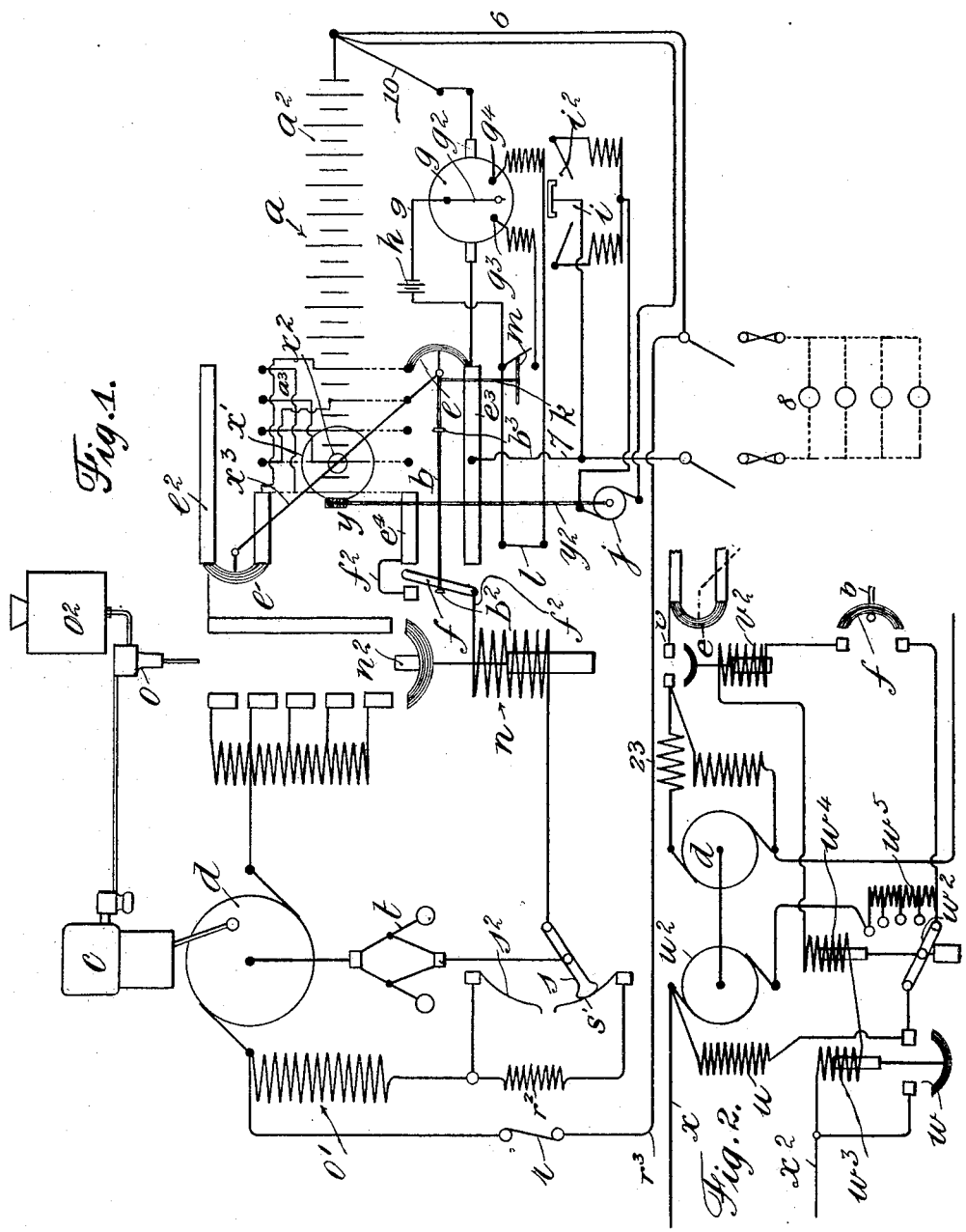

UNITED STATES PATENT OFFICE.

CHARLES BELL WALKER, OF SOLIHULL, ENGLAND.

AUTOMATIC ELECTRIC GENERATING PLANT.

1,217,670.  Specification of Letters Patent.  Patented Feb. 27, 1917.

Application filed March 14, 1910. Serial No. 549,195.

*To all whom it may concern:*

Be it known that I, CHARLES B. WALKER, a subject of the King of Great Britain, residing at Solihull, in the county of Warwick, England, have invented a new and useful Improvement in Automatic Electric Generating Plants, of which the following is a specification.

The invention has reference to an automatic electric generating plant of the kind using an explosive or other engine as the prime motive power in connection with an electro-magnetic machine or dynamo and a storage battery.

The invention combines in such an automatic plant a storage battery provided with a number of regulating cells adapted to be automatically cut in and out of the circuit with the object of maintaining at the discharge terminals of said circuit a predetermined constant potential, the generator to be automatically started for recharging only after the whole of the regulating cells have been cut into the circuit and to be stopped only when, after fully charging, said regulating cells have been cut out of the circuit. For this purpose the invention combines with the battery regulating switch, or a part moved thereby, further switch devices which are interlocked with said regulating switch to automatically disconnect or connect the dynamo acting as such or as an electric motor from or to the battery, said interlocked switch devices also being made to operate a tap, valve, cock or other feature controlling the fuel or other motive power supply to the engine for the purpose of causing the said engine to work and drive the generator. In addition the invention combines devices which automatically operate to prevent the dynamo running indefinitely as a motor fed from the battery should anything become faulty in or connected with the engine to prevent said engine working.

If the dynamo is driven by an electric motor the interlocked switch would control either directly or indirectly as by means of a solenoid-operated switch or starter, a separate current supply to the motor.

Centrifugal or other governing devices are provided to automatically open the battery or motor circuits consequent upon the speed of the engine falling off or the engine stopping altogether, as in the case of a failure in the petrol or other fuel supply, to thereby provide so that the dynamo shall not run indefinitely as a motor and uselessly discharge the battery cells.

The drawings forming part hereof show in Figure 1 a diagrammatic plan of a plant according to the invention using an explosive engine as the prime motive power, and in Fig. 2 using an electric motor instead of the explosive engine with the motor fed from a separate source of supply.

The storage battery is indicated at $a$, the cylinder of the petrol engine at $c$, the dynamo at $d$ which is geared to the crank shaft of the engine, the battery regulating switch at $e\ e$, the interlocked or interlinked switch or switch gear at $f$, and the potential switch at $g$.

The potential switch $g$ may be combined with a volt-meter connected across the supply terminals, with its needle or pointer $g^2$ in an "off" position between two contacts $g^3$, $g^4$, and adapted to indicate the predetermined potential which is desired to be maintained at the supply terminals. $a^2$ are the permanent cells of the battery, or those always in use, while $a^3$ represent a number of regulating cells which are automatically cut in or out with or from the permanent cells. The contact $g^3$ is the cutting out contact and the contact $g^4$ is the cutting in contact of the potential switch, and these contacts are placed within an independent circuit fed by a small dry or other battery, such as $h$, arranged to operate relays, $i$, $i^2$ working a reversing pilot motor, $j$, which is mechanically connected with the regulating switch, $e$, so as to operate said switch, said pilot motor being in circuit with the principal battery as indicated and operating so that if the pointer is on the contact $g^3$ the pilot motor revolves in one direction and if the pointer is on the contact $g^4$ said pilot motor revolves in the reverse direction and is stationary when the pointer is in an intermediate position as shown in the diagram. The pilot motor $j$ and the regulating switch $e$ are therefore coupled so that they work together from the volt-meter control through the operation of the potential switch $g$. Two smaller switches $l$ and $m$ are provided in the relay circuits $h$ to automatically close, and to be opened by the movement of the regulating switch $e$ in such manner that when the said switch $e$ has arrived at the limit of its travel in either direction one or other of said smaller switches is operated to open the particular relay circuit.

The switch $e$ is composed of the contacts $e^2$, $e^3$ and $e^4$ with suitable engaging means actuated from the pilot motor $j$ through the medium of the shaft $y^2$ and suitable gearing consisting of the pinion $y$ carried by the shaft $y^2$ and the gear wheel $x'$ and connection $x^2$ diagrammatically shown by Fig. 1. The rod $b$ and the member $k$ are also operatively associated with the contact engaging means. $r$ is the thermal cut-out comprising the thermal coil $r^2$ and which is diagrammatically shown and will embody all of the accessories usually comprised in a device of this class including a switch $r^0$ connected with the main field $o'$ of the generator $d$ with the battery $a$. The general operation may be stated as follows: The positions of the parts are with all of the regulating cells $a^3$ included in the battery, the circuits from which are at the time through the wires 6 and 7 to the lamps 8 and through the wires 9 and 10 to the potential switch $g$, and thence to the contacts $e^2$, $e^3$. All the current is at this time cut off from the generator $d$ and the thermal cut out $r$. If the potential in the battery falls to the predetermined extent, the pointer $g^2$ swings over to the contact $g^4$ and operates the relay $i^2$ to start the pilot motor $j$ in a direction to move the switch $e$ farther to the left, which has the effect of closing the switch $f$ and opening the switch $l$ through the members $k$ and $b$ disposed to operate the said switches. The closing of the switch $f$ operates the starter $n$ and allows current from the battery $a$ to pass through the switch $s$ and through the coil $r^2$ of the thermal cut-out to the field coil $o'$ through the generator and back to the battery by way of the contact $e^4$. The starter $n$ fully closes and opens the petrol valve $o$. If the engine $c$ picks up immediately and drives the generator, the governor $t$ moves the switch $s$ from the contact $s'$ over to the contact $s^2$, thereby short-circuiting the thermal coil $r^2$ which is connected to the said contacts. If the engine $c$ does not pick up, the coil $r^2$ of the thermal becomes heated and through the usual components of this cut-out the switch $r^0$ is opened, thereby opening the main circuit, through wires 23 and 6 which are connected, between the negative pole of the battery $a$ and the generator and whereby the generator will automatically stop running as a motor after a period of time when it has been operating as a motor. The charging current from the generator to the battery is through the starter $n$ and contact $e^4$. The switch $r^0$ must be closed by hand. Therefore in accordance with the position of the parts shown or in accordance with the diagram illustrated by Fig. 1 the battery is fully charged, the generator and the petrol engine having just stopped, and no current from the battery is being used as the lamp switches are open. In this position of the parts the end or regulating cells $a^3$ of the battery $a$, although fully charged and included in the battery on the charging side, are all cut out of the discharge side of the battery through the operation of the switch $e$ so that the discharge side of the battery will then include only the body cells of the battery, and not the end cells. When, by the use of current from the battery, the potential falls, the end or regulating cells are one after the other included in the battery on the discharge side to maintain the potential and are simultaneously but in defined order cut out of the battery on the charging side. It therefore follows that when all of the end cells have been cut into the battery on the discharge side, said end or regulating cells have been cut out of the battery on the charging side, so that when the generator first operates for recharging the battery the end cells are not included in the battery on the charging side, so that in the first instance the body part only of the battery is charged up. As the end cells, one after the other are included in the battery on the charging side they are in proper order simultaneously cut out of the battery on the discharging side. From the foregoing it will be understood that the potential will gradually rise and the regulating cells will be cut out of the battery on the discharge side and into the battery on the charge side until the whole of the regulating cells are included in the battery on the charging side and cut out on the discharging side and are fully charged to the predetermined voltage, when the regulating switch $e$ will open the switch $f$ and cause the generating plant to stop. The field circuit of the generator is as follows: To start up the generator the lower contact $e^3$ of the switch $e$ effects the closing of the switch $f$ to complete the circuit $f^2$, and the current will then pass from the battery through the switch $f$, through the solenoid coil of the starter $n$, through the switch $s$, through the coil $r^2$ of the cut-out $r$ to the field coil $o'$ of the generator, returning to the opposite end of the battery through the switch $r^0$ of the cut-out $r$ and the wire 23 leading from this switch to the wire 6 connected to said opposite end of the battery. The switch $r^0$ is hand closed, as hereinbefore specified, but is self-opening from the heat of the coil, said cut-out being a well known device for the purpose, known as "a time lag element circuit breaker." The position of the switch $s$ as shown in the drawing includes the coil of the cut-out $r$ in the circuit from the battery through the field coil $o'$ to the generator, and this is the position of the parts while the generator works as a motor.

The regulating switch $e$ is arranged so that the charging of the cells is on the side $e^2$ and the discharging on the side $e^3$, and its position is represented with the whole of the regulating cells cut out of the battery.

From the foregoing it will be understood that when the potential falls after the last regulating cell has been cut in an attempt is made by the pilot motor $j$ to cut in a further cell, which has the effect of mechanically or otherwise operating the interlocked or interlinked switch, or switch gear, $f$ to close the circuit $f^2$. In other words, after the last regulating cell has been cut in a fall in the potential of the battery will again operate the pilot motor $j$ to mechanically move the interlocked or interlinked switch $f$ to close the circuit $f^2$ and start up the motor. The drawings show the connection between the interlocked switch $f$ and the regulating switch $e$ in the form of a rod $b$ moved by said switch and having as a part of it stop collars $b^2$, $b^3$, one stop collar pulling against the switch $f$ to open it and the other pushing against the said switch to close the same, and therefore it will be seen that the continued movement of the regulating switch $e$ after the last regulating cell has been cut in is only to close the switch $f$, the pilot motor still operating upon said switch $e$ to effect this closing operation.

Immediately the interlocked or interlinked switch or switch gear $f$ automatically opens, the starter moves back to its open position, the petrol supply is automatically cut off, and the petrol engine will stop, and the dynamo be entirely cut out from the battery circuit.

So that the dynamo $d$ shall not run indefinitely as a motor from the battery supply, driving the petrol engine at a time anything is faulty with the latter, the thermal or other time limit cut-out $r$ is provided within the dynamo circuit and placed under the control of the engine governor $t$. This thermal cut-out will automatically break the dynamo circuit after a sufficiently reasonable period has expired for the petrol engine to become operative, but the said thermal cut-out when the petrol engine is in effective operation is short circuited by the contact $s$ moving over to the contact $s^2$ through the centrifugal action of the governor $t$.

I am thus able to provide a completely automatic plant which is entirely under the control of the potential differences in the regulating storage battery consequent upon the use of the current, the primary feature of such plant being the interlocked or interlinked switch or switch operating gear $f$ and $e$ together with its operation on the dynamo circuit and the fuel supply. The only attention such a plant requires is in case the petrol or other engine becomes faulty. The switches $l$ and $m$ are mounted to have a gravitating movement and are therefore self-closing, but each is mechanically opened by the movement of the regulating switch $e$ and the parts of the latter through the medium of the part or shifter $k$ which as shown in the drawing operates upon the switch $m$ to open said latter switch. The switches $m$ and $l$ limit the travel of the regulating switch $e$ in either of its two directions for cutting in and cutting out the regulating cells $a^3$ in accordance with the operation of the generator.

The diagram Fig. 2 indicates how the invention could be carried into effect where an electric motor is used instead of the petrol or other engine and is fed from a separate source of supply. With regard to Fig. 2 the greater part of the drawing is exactly the same as Fig. 1. $d$ is the generator, $u^2$ is the motor. $v^2$ is what is well known in the electrical trade as an automatic cut-in and cut-out switch. It is placed in the charging circuit from the generator $d$, between the wires 40 and 41, and its function is to automatically close the circuit when current is being generated, and to automatically open the circuit against return current from the battery to the generator when generator stops. The charging current in this arrangement does not come through the starter $n$ as in the Fig. 1 arrangement, but other than the aforesaid the arrangement of Fig. 2 is exactly the same as that of Fig. 1.

In this arrangement shown by Fig. 2, the interlocked switch or switch gear, $f$, closes the separate motor circuit in the field $u$ by the switch $e$, and the battery charging circuit by the switch $v$, and also makes operative the starter $w^2$, so that in the separate supply mains the motor for driving the generator can be started and stopped at any time by the difference in potential on the battery to always maintain a desired potential in the battery, and to automatically keep said battery in a fully charged condition when the supply therefrom is not being used.

In this arrangement the interlocked switch $f$ (opened and closed by the operation of the switch gear $e$ in the same manner as described with reference to Fig. 1) when in its closed position completes the separate electric circuit through the field $u$ of the electric motor $u^2$, and simultaneously excites the coils $v^2$, $w^3$ and $w^4$ of the switches $v$, $w$ and the starter $w^2$. The starter $w^2$ is a slow speed one cutting out the resistances $w^5$ and closing the armature circuit of the motor $u^2$. When the switch $f$ opens, the switches $v$ and $w$ also automatically open, as also does the starter $w^2$. In this way from separate electric supply mains $x$, $x^2$ the electric motor $u^2$, driving the generator can be started and stopped at any time from the automatic operation of the switch $f$ consequent upon difference in potential on the battery $a$, so that a desired potential can be always maintained in said battery, and said battery be kept in a fully charged condition at a time when the battery circuit is not being used for lighting or other purposes.

Having now described my invention what I claim and desire to secure by Letters Patent is:—

1. An automatic generating electric plant comprising an electromagnetic machine to run as a generator or as a motor, driving means for said machine, a storage battery having a number of regulating cells to be cut in and out of circuit to maintain a constant potential at the discharge terminals, an automatic regulating switch controlling the cutting in and out of said regulating cells, other switch means coöperating with the said regulating switch for automatically connecting the dynamo to the battery when a predetermined number of regulating cells have been automatically cut into circuit on the fall of potential and to disconnect said dynamo from the battery when the predetermined number of regulating cells has been automatically cut out of circuit upon the rise of potential, and means automatically movable with the switch means to automatically turn on and off the fuel supply to the driving means simultaneously with the connection and disconnection of the dynamo from the battery.

2. An automatic electric generating plant comprising an electromagnetic machine operative as a generator or as a motor, driving means for said machine, a storage battery having a number of regulating cells adapted to be cut in and out of circuit to maintain a constant potential at the discharge terminals, an automatic regulating switch controlling the cutting in and out of the said regulating cells, switch means coöperating with said regulating switch for connecting the machine to the battery when a predetermined number of regulating cells has been automatically cut into circuit on the fall of potential and to disconnect said machine from the battery when a predetermined number of regulating cells has been cut out of circuit upon the rise of potential, means automatically movable with the switch means to automatically turn on and off the fuel supply to the driving means simultaneously with the connection and disconnection of the dynamo from the battery, and devices for preventing the running of the machine as a motor in the event that the driving means will not become effective.

3. An automatic electric generating and storage plant comprising a dynamo, means for driving the said dynamo, a storage battery having a number of regulating cells, a regulating switch automatically controlling the cutting in and out of the cells, a switch gear for connecting the dynamo to the battery, and devices for automatically controlling the medium for operating the driving means.

4. An automatic electric generating plant combining an electromagnetic machine to run as a generator or as a motor, driving means for said machine, a storage battery having a number of regulating cells to be cut in and out of circuit and which is connected up to be charged by the machine and to feed said machine as a motor, means for automatically cutting in and out the regulating cells on the fall or rise of battery potential, means for stopping the driving means, and devices for preventing the indefinite running of the machine as a motor in case the driving means will not become effective.

In witness whereof I have hereunto set my hand in presence of two witnesses.

CHARLES BELL WALKER.

Witnesses:
FRANCIS BINNS,
ETHEL M. WEBB.